UNITED STATES PATENT OFFICE.

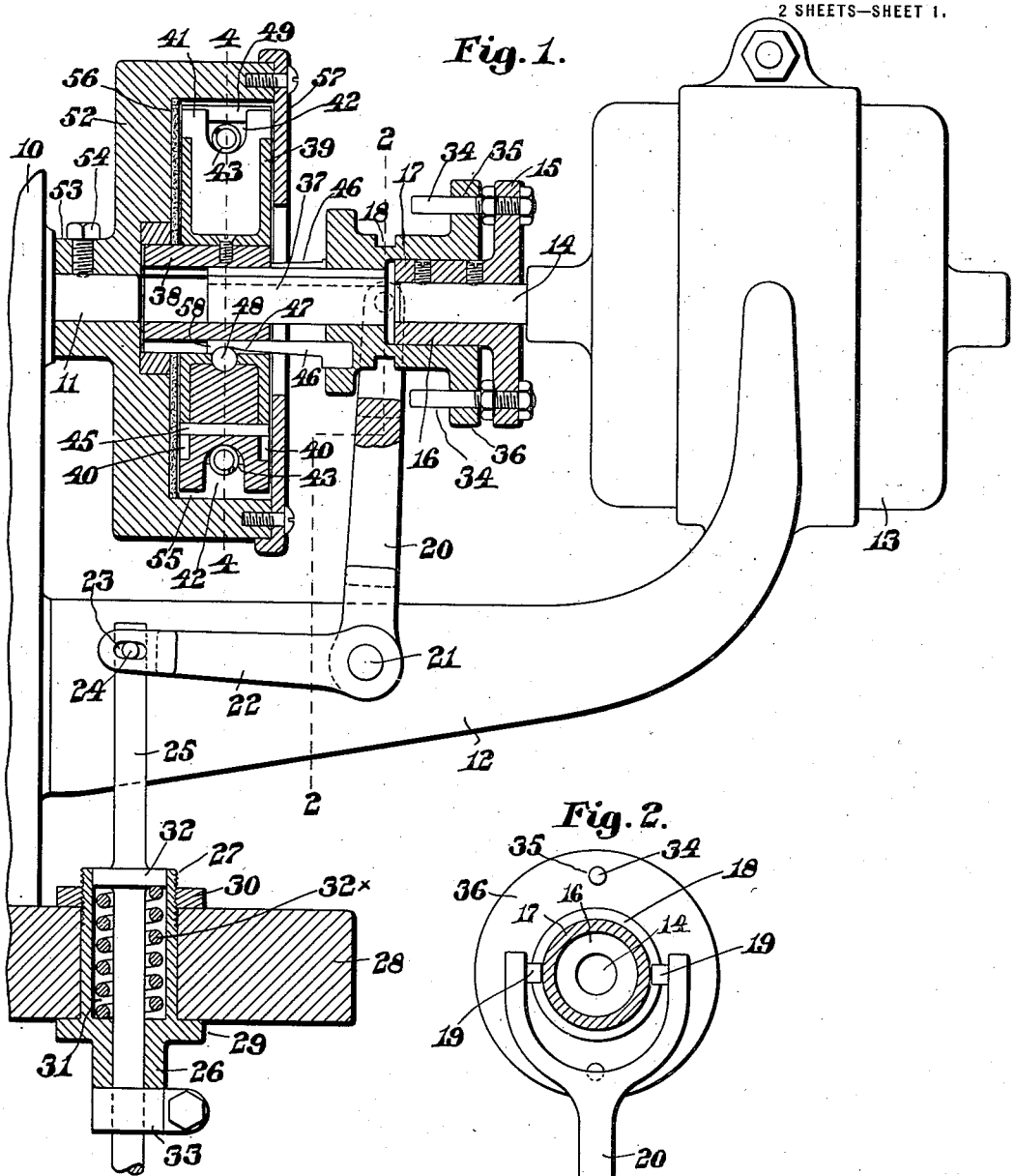

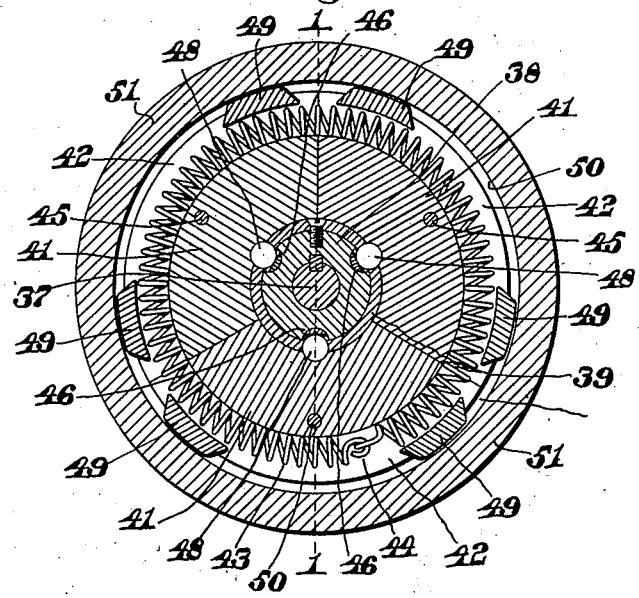

FRED A. READ AND ELISHA J. TOWLE, OF LYNN, MASSACHUSETTS.

CLUTCH.

1,279,906.  Specification of Letters Patent.  Patented Sept. 24, 1918.

Application filed November 16, 1917. Serial No. 202,861.

*To all whom it may concern:*

Be it known that we, FRED A. READ and ELISHA J. TOWLE, citizens of the United States of America, and residents of Lynn, county of Essex, Commonwealth of Massachusetts, have invented certain new and useful Improvements in Clutches, of which the following is a specification.

This invention relates to clutches for power driven machines and has for its object the production of a device of this character which may be applied directly to the main driving shaft of a machine and impart rotary motion thereto from a motor driven shaft in alinement therewith.

A further object of the invention is the production of such a device in which a slow speed may be imparted to the machine shaft prior to the complete connection between the clutch members whereby the machine shaft may subsequently be driven at full speed.

The invention consists in certain novel features of construction and arrangement of parts which will be fully understood by reference to the description of the drawings and to the claims to be hereinafter given.

For the purpose of illustrating the invention one preferred form thereof is illustrated in the drawings, this form having been found to give satisfactory and reliable results, although it is to be understood that the various instrumentalities of which the invention consists can be variously arranged and organized and that the invention is not limited to the precise arrangement and organization of these instrumentalities as herein shown and described, except as required by the scope of the appended claims.

Of the drawings:

Figure 1 represents a vertical section of a device embodying the principles of the present invention, the motor for rotating the driving shaft being shown in elevation.

Fig. 2 represents a transverse section on line 2, 2 on Fig. 1.

Fig. 3 represents an end view of the reciprocating clutch operating member.

Fig. 4 represents a section on line 4, 4 on Fig. 1 and

Fig. 5 represents an elevation of the inner clutch member.

Similar characters designate like parts throughout the several figures of the drawings.

In the drawings, 10 is a portion of a frame of a machine from which extends the driving shaft 11 thereof. This frame 10 is provided with a bracket 12 in the outer end of which is mounted an electric motor 13 which may be of any well known construction. The motor 13 is provided with a driving shaft 14 in alinement with the shaft 11 of the machine to be operated.

Secured to the driving shaft 14 is a disk 15 on the hub 16 of which is slidably mounted the reciprocating member 17. This member 17 has an annular groove 18 in the periphery thereof into which project the trunnions 19 of the lever 20 pivoted at 21 to the bracket 12. The lever 20 has an arm 22 the outer end of which is provided with a slot 23 in which is positioned a pin 24 extending laterally from an operating rod 25 the lower end of which is connected to any suitable operating device such as a treadle. As the treadle forms no part of the present invention it is not considered necessary to illustrate the same.

The rod 25 extends through a bearing 26 forming a part of a casing 27 secured in the base 28, the lower end being provided with a flange 29 abutting the under face of the base 28, while the upper end of said casing is provided with a nut 30 threaded thereto and clamped against the upper face of the base 28.

The casing 27 is provided with a chamber 31 in which a shouldered flange 32 is adapted to move against the tension of the spring 32× surrounding the rod 25 and interposed between said shouldered flange 32 and the bottom of the chamber 31. This spring 32× acting against the shouldered flange 32 normally retains the lever 20, 22 in the position indicated in Fig. 1, with the stop member 33, clamped to the rod 25, bearing against the lower end of the bearing 26. The disk 15 is provided with a plurality of parallel members 34 extending through openings 35 in a flange 36 of the reciprocating member 17.

When the motor 13 is in operation the driving shaft 14 thereof will impart rotary movement to the reciprocating member 17 by means of the members 34 positioned in the openings 35 in the flange 36 of said reciprocating member 17.

The reciprocating member 17 is provided with a stud 37 in axial alinement with the shafts 11 and 14.

Mounted upon the outer end of the stud 37 is the slidable member 38 keyed to said stud so as to rotate therewith. Mounted upon the periphery of the slidable member 38 and rotating therewith is a flanged collar 39 each flange of which is provided with radial slots 40. Between the flanges of the collar 39 are positioned a plurality of segments 41 the peripheries of which are provided with grooves 42 in which is positioned a continuous resilient member 43 adapted to retain the segments 41 in their innermost position under normal conditions. As shown in the drawings this resilient member is shown as a helical spring the opposite ends of which are secured together as shown at 44. Each segment 41 is provided with a transverse pin 45 the ends of which are positioned in the slots 40 and serve to guide the segments 41 when moved outwardly and causing them to be moved radially to the axis of the stud 37.

The reciprocating member 17 is provided with a plurality of projecting members 46 for each of the segments 41. Each of the members 46 is provided with a depression 47 a portion of the wall of each depression being inclined sufficiently to form a wedge. Into each depression 47 extends a portion of an anti-friction member such as the ball 48, said ball 48 being positioned in a pocket in the annular portion of the collar 39 and having a portion thereof extending into a depression in the inner cylindrical surface of a segment 41.

Dovetailed to the outer edges of the flanges of said collar 39 are a plurality of cross members 49 preferably made of fiber board or some material which would provide a good gripping surface when the segments 41 are moved outwardly to force the cross members 49 into contact with the inner cylindrical face 50 of the annular flange 51 formed upon the casing 52, the hub 53 of which is secured by means of the screw 54 to the driving shaft 11 of the machine 10.

The annular flange 51 of the casing 52 forms a chamber 55 in said casing and the inner wall of said chamber 55 is provided with a friction disk 56 secured to said casing 52. This chamber 55 is partially closed by means of the plate 57.

Under normal conditions the collar 39 and the segments 41 positioned between the flanges of said collar are adapted to be freely rotated in the chamber 55 free from contact with the friction disk 56 and the closing plate 57. When the treadle rod 25 is depressed the lever 20, 22 will be moved about its pivot 21 thereby causing the reciprocating member 17 to be moved toward the casing 52. In this movement the inclined portions of the wedge members 46 will act upon the balls 48 and in their initial movement will move the inner face of the collar 39 into frictional contact with the friction disk 56 thereby imparting a rotary movement to the casing 52 and the machine shaft 11 at a slow speed, this speed gradually being increased as the inner face of the collar 39 is forced into firmer contact with the friction disk 56. The continuation of the movement of the reciprocating member 17 toward the casing 52 will cause the wedge members 46 acting upon the balls 48 to force the segments 41 outwardly so that the cross gripping members 49 will impinge upon the inner cylindrical surface 50 of the flange 51. When this gripping has been effected the casing 52 of the shaft 11 to which it is secured will be rotated at the full speed of the motor 13. This rotary movement from the shaft 14 to the machine shaft 11 will continue to be transmitted at the full speed of the motor 13 as long as the operator retains the treadle rod 25 depressed. As soon as the operator removes his foot from the treadle, the spring 32$^x$ acting upon the shouldered flange 32 will move the treadle rod 25 upwardly and through the medium of the lever 22 will cause the reciprocating member 17 to return to its normal position as indicated in Fig. 1.

As soon as the lower parts of the depressions 47 in the members 46 come opposite the balls 48 the resilient member 43 will move the segments 41 inwardly and break the gripping contact between the members 49 and the cylindrical wall 50 of the flange 51.

When the lowest parts of the depressions 47 are opposite the balls 48, the projections 58 on the end of the members 46 will engage the balls 48 and cause the slidable member 38 and the collar 39 to be moved slightly along the stud 37 until the inner face of the collar 39 is free from contact with the friction disk 56.

This makes a very convenient form of clutch mechanism adapted to transmit motion to a machine main shaft from a motor mounted upon the frame of said machine with its driving shaft in axial alinement with the machine shaft.

One of the particular advantages of the device is that the machine shaft may have imparted thereto an initial slow speed which may be gradually increased until the full speed of the motor is transmitted to said machine shaft.

It is believed that the operation and many advantages of the invention will be fully understood by the foregoing description.

Having thus described our invention, we claim:

1. In a device of the class described, two alined shafts; means for driving one shaft; a reciprocating member adapted to be rotated by said driving shaft; a casing secured to the other shaft having a cylindrical flange; a stud on said member extending into said casing; a collar slidable thereon and revoluble therewith; members on said slidable member adapted to be moved radially into gripping contact with said flange; and means on said reciprocating member for moving said radially movable members outwardly.

2. In a device of the class described, two alined shafts; means for driving one shaft; a reciprocating member adapted to be rotated by said driving shaft; a casing secured to the other shaft having a cylindrical flange; a stud on said member extending into said casing; a collar slidable thereon and revoluble therewith; members on said slidable member adapted to be moved radially into gripping contact with said flange; and a plurality of wedge members on said reciprocating member for moving said radially movable members outwardly.

3. In a device of the class described, two alined shafts; means for driving one shaft; a reciprocating member adapted to be rotated by said driving shaft; a casing secured to the other shaft having a cylindrical flange; a stud on said member extending into said casing; a collar slidable thereon and revoluble therewith; members on said slidable member adapted to be moved radially into gripping contact with said flange; a plurality of wedge members on said reciprocating member for moving said radially movable members outwardly; and an anti-friction member between each radially movable member and its co-acting wedge member.

4. In a device of the class described, two alined shafts; means for driving one shaft; a reciprocating member adapted to be rotated by said driving shaft; a casing secured to the other shaft having a cylindrical flange; a stud on said member extending into said casing; a collar slidable thereon and revoluble therewith; members on said slidable member adapted to be moved radially into gripping contact with said flange and having a circumferential groove therein; and a spring in said groove adapted to retain said members free from contact with said flange under normal conditions.

5. In a device of the class described, two alined shafts; means for driving one shaft; a disk secured to and revoluble with said driving shaft; a plurality of parallel pins thereon; a reciprocating member having a plurality of holes in which said pins are positioned; a casing secured to the other shaft having a cylindrical flange; a stud on said member extending into said casing; a collar slidable thereon and revoluble therewith; members on said slidable member adapted to be moved radially into gripping contact with said flange; and means on said reciprocating member for moving said radially movable members outwardly.

6. In a device of the class described, two alined shafts; means for driving one shaft; a reciprocating member adapted to be rotated by said driving shaft; a pivoted lever for actuating said reciprocating member; a casing secured to the other shaft having a cylindrical flange; a stud on said member extending into said casing; a collar slidable thereon and revoluble therewith; members on said slidable member adapted to be moved radially into gripping contact with said flange; and means on said reciprocating member for moving said radially movable members outwardly.

7. In a device of the class described, two alined shafts; means for driving one shaft; a reciprocating member adapted to be rotated by said driving shaft; a plurality of wedge members carried by said reciprocating member; a stud axially disposed on said reciprocating member; a member slidable on said stud; a flanged collar secured to said slidable member; a plurality of members between the flanges of said collar adapted to be moved radially by said wedge members; means for retaining said radially movable members in their inner positions under normal conditions; and a member secured to and revoluble with the other shaft and provided with a cylindrical flange with which said radially movable members are adapted to be moved into gripping contact by said wedge members.

8. In a device of the class described, two alined shafts; means for driving one shaft; a reciprocating member adapted to be rotated by said driving shaft; a plurality of wedge members carried by said reciprocating member; a stud axially disposed on said reciprocating member; a member slidable on said stud; a flanged collar secured to said slidable member and provided with radial slots in the flanges thereof; a plurality of members between the flanges of said collar adapted to be moved radially by said wedge members each member having a transverse pin therein the ends of which are positioned in said slots; means for retaining said radially movable members in their inner positions under normal conditions; and a member secured to and revoluble with the other shaft and provided with a cylindrical flange with which said radially movable members are adapted to be moved into gripping contact by said wedge members.

9. In a device of the class described, the combination of two alined shafts; means for rotating one shaft; a reciprocating member adapted to be rotated by said driving shaft; a stud axially positioned on said reciprocating member; a rotating member slidably mounted on said stud; a flanged collar secured thereto; segmental members between the flanges of said collar; means on said reciprocating member coacting with said segmental members for moving said members outwardly; and a casing secured to the other shaft and having a cylindrical flange with which said members are adapted to coact.

10. In a device of the class described, the combination of two alined shafts; means for rotating one shaft; a reciprocating member adapted to be rotated by said driving shaft; a stud axially positioned on said reciprocating member; a rotating member slidably mounted on said stud; a flanged collar secured thereto; segmental members between the flanges of said collar; a plurality of cross members secured to the periphery of said segmental members; means on said reciprocating member coacting with said segmental members for moving said members outwardly; and a casing secured to the other shaft and having a cylindrical flange with which said cross members are adapted to coact.

11. In a device of the class described, the combination of two alined shafts; means for rotating one shaft; a reciprocating member adapted to be rotated by said driving shaft; a stud axially positioned on said reciprocating member; a rotating member slidably mounted on said stud; a flanged collar secured thereto; segmental members between the flanges of said collar; a plurality of cross members dovetailed into the periphery of said segmental members; means on said reciprocating member coacting with said segmental members for moving said members outwardly; and a casing secured to the other shaft and having a cylindrical flange with which said cross members are adapted to coact.

12. In a device of the class described, the combination of two alined shafts; means for rotating one shaft; a reciprocating member adapted to be rotated by said driving shaft; a stud axially positioned on said reciprocating member; a rotating member slidably mounted on said stud; a flanged collar secured thereto; segmental members between the flanges of said collar; a plurality of cross members of fibrous material secured to the periphery of said segmental members; means on said reciprocating member coacting with said segmental members for moving said members outwardly; and a casing secured to the other shaft and having a cylindrical flange with which said cross members are adapted to coact.

13. In a device of the class described, the combination of two alined shafts; means for rotating one shaft; a reciprocating member adapted to be rotated by said driving shaft; a stud axially positioned on said reciprocating member; a rotating member slidably mounted on said stud; a flanged collar secured thereto; segmental members between the flanges of said collar, said segmental members having a circumferential groove in the periphery thereof; a continuous resilient member positioned in said groove and adapted to move said members inwardly; means on said reciprocating member coacting with said segmental members for moving said members outwardly; and a casing secured to the other shaft and having a cylindrical flange with which said segmental members are adapted to coact.

14. In a device of the class described, the combination of two alined shafts; means for rotating one shaft; a reciprocating member adapted to be rotated by said driving shaft; a stud axially positioned on said reciprocating member; a slidable member keyed to said stud; a flanged collar secured thereto; segmental members between the flanges of said collar; pins on said reciprocating member having wedge shaped depressions; balls in said depressions extending into depressions in said segmental members; a casing secured to the other shaft having a cylindrical flange with which said segmental members coact; and a friction disk secured to said casing and with which said flanged collar is adapted to engage on the initial movement of said reciprocating member toward said casing.

15. In a device of the class described, two alined shafts; means for driving one shaft; a casing secured to the other shaft and having a cylindrical flange; a collar adapted to be moved endwise to engage with the end of said casing; segmental members carried by said collar and adapted to be moved outwardly into engagement with said flange; and means rotatable with said driving shaft and operable to impart end movement to said collar and then outward movement to said segmental members.

16. In a device of the class described, two alined shafts; means for driving one shaft; a casing secured to the other shaft and having a cylindrical flange; a friction disk secured to the end of said casing within said cylindrical flange; a collar adapted to be moved endwise to engage with the end of said casing; segmental members carried by said collar and adapted to be moved outwardly into engagement with said flange; and means rotatable with said driving shaft and operable to impart end movement to said collar and then outward movement to said segmental members.

17. In a device of the class described, two alined shafts; means for driving one shaft; a casing secured to the other shaft and having a cylindrical flange; a reciprocating member rotatable by said driving shaft; means for imparting end movement to said reciprocating member; a slidable collar adapted to frictionally contact with said casing; members carried by said collar for gripping said flange; and means carried by said reciprocating member for imparting end movement to said collar and subsequently moving said gripping members into contact with said flange.

18. In a device of the class described, two alined shafts; means for driving one shaft; a casing secured to the other shaft and having a cylindrical flange; a reciprocating member rotatable by said driving shaft; means for imparting end movement to said reciprocating member; a slidable collar adapted to frictionally contact with said casing; members carried by said collar for gripping said flange; and a plurality of wedge shaped pins carried by said reciprocating member for imparting end movement to said collar and subsequently moving said gripping members into contact with said flange.

Signed by us at 4 Post Office Sq., Boston, Mass., this 15 day of November, 1917.

FRED A. READ.
ELISHA J. TOWLE.

Witnesses:
WALTER E. LOMBARD,
NATHAN C. LOMBARD.